June 15, 1965 F. S. HYER ETAL 3,189,156
APPARATUS FOR ALINING AND SPACING ARTICLES
Filed Nov. 9, 1962 5 Sheets-Sheet 3
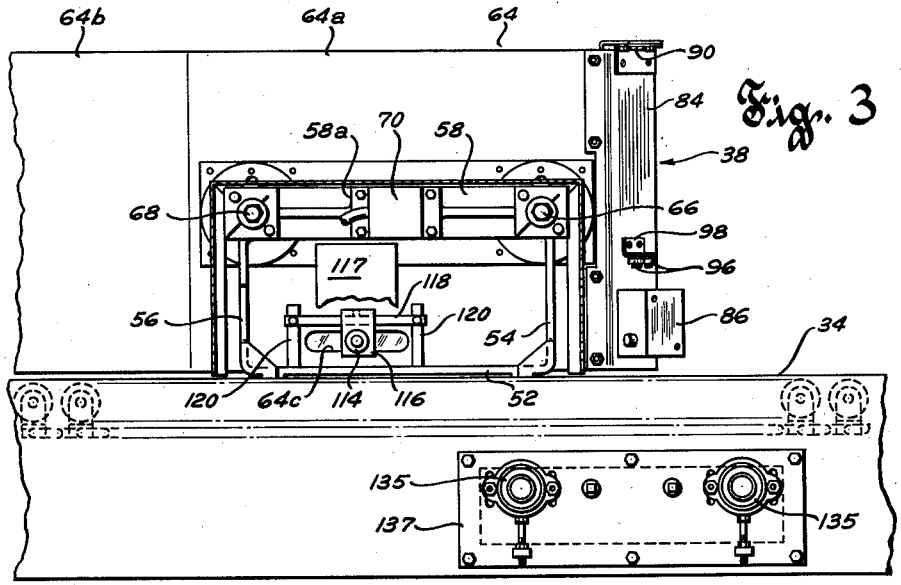
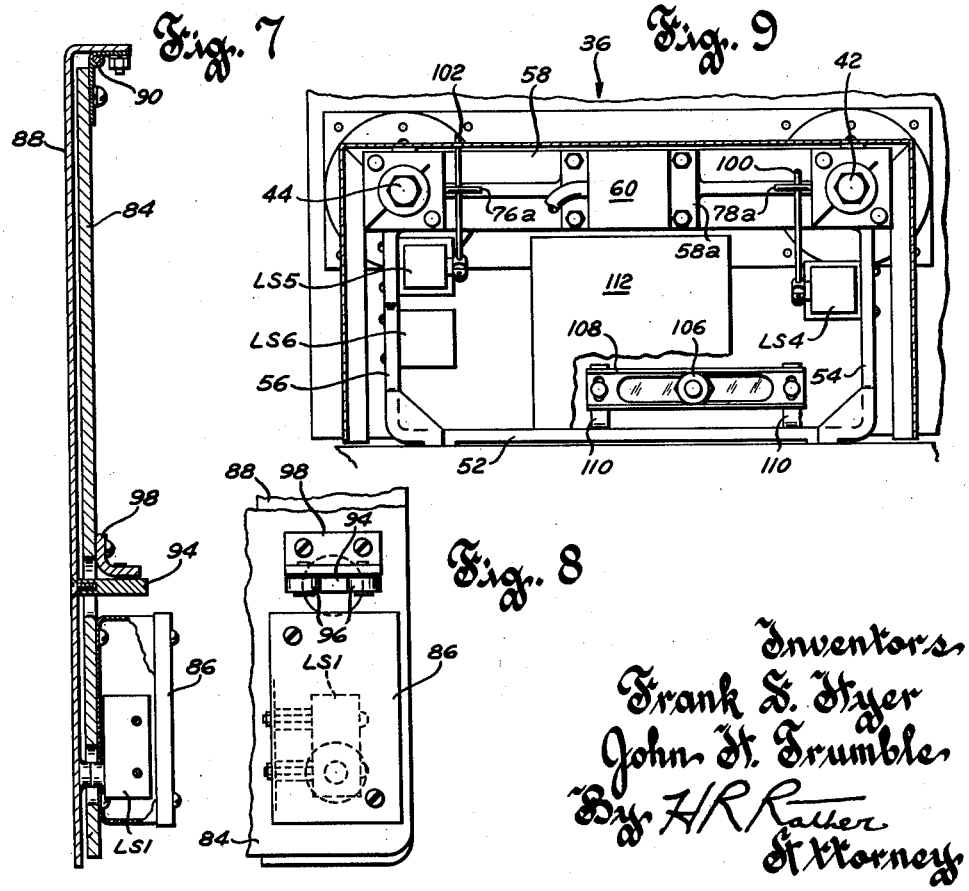
Inventors
Frank S. Hyer
John H. Trumble
By H R Rather
Attorney

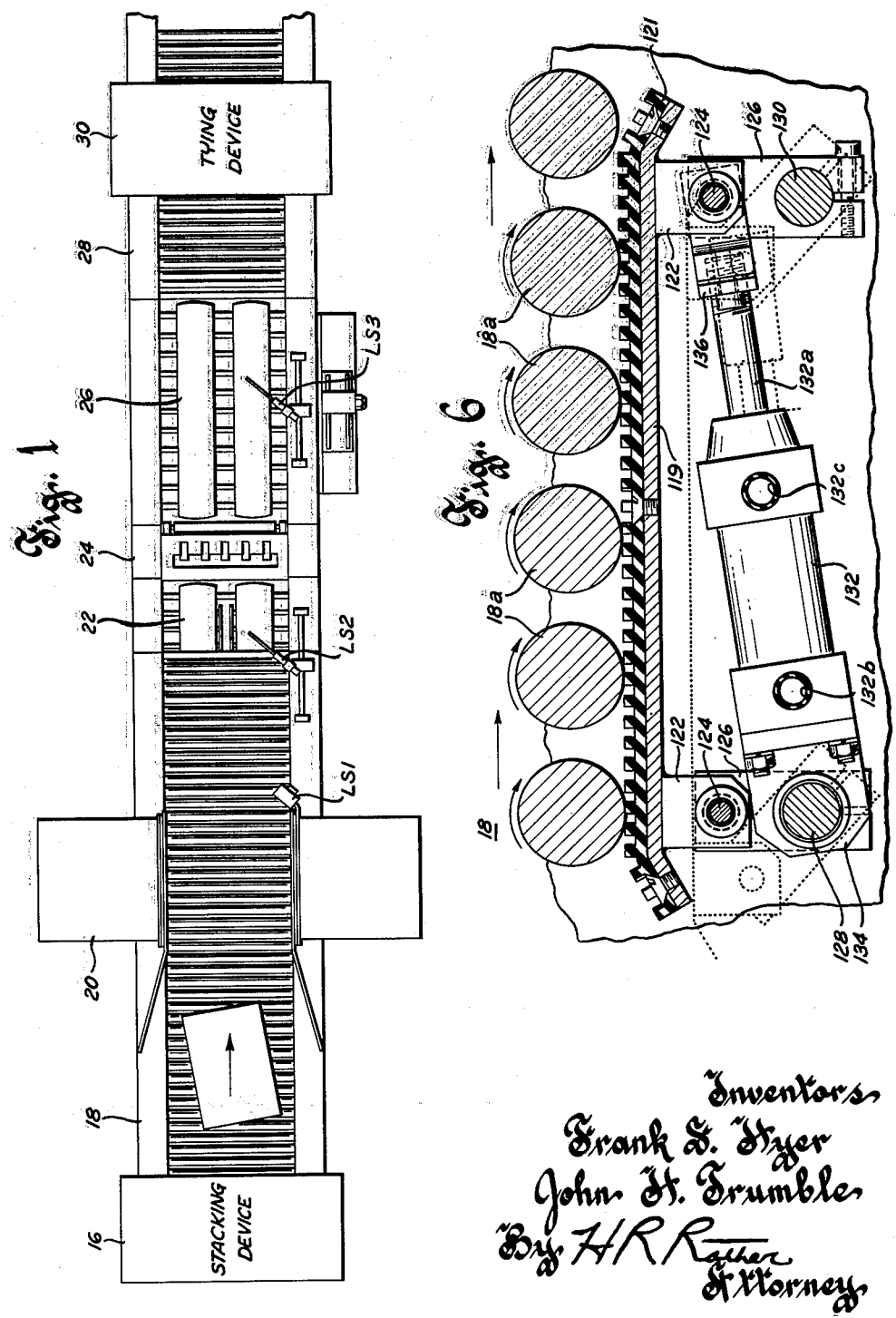

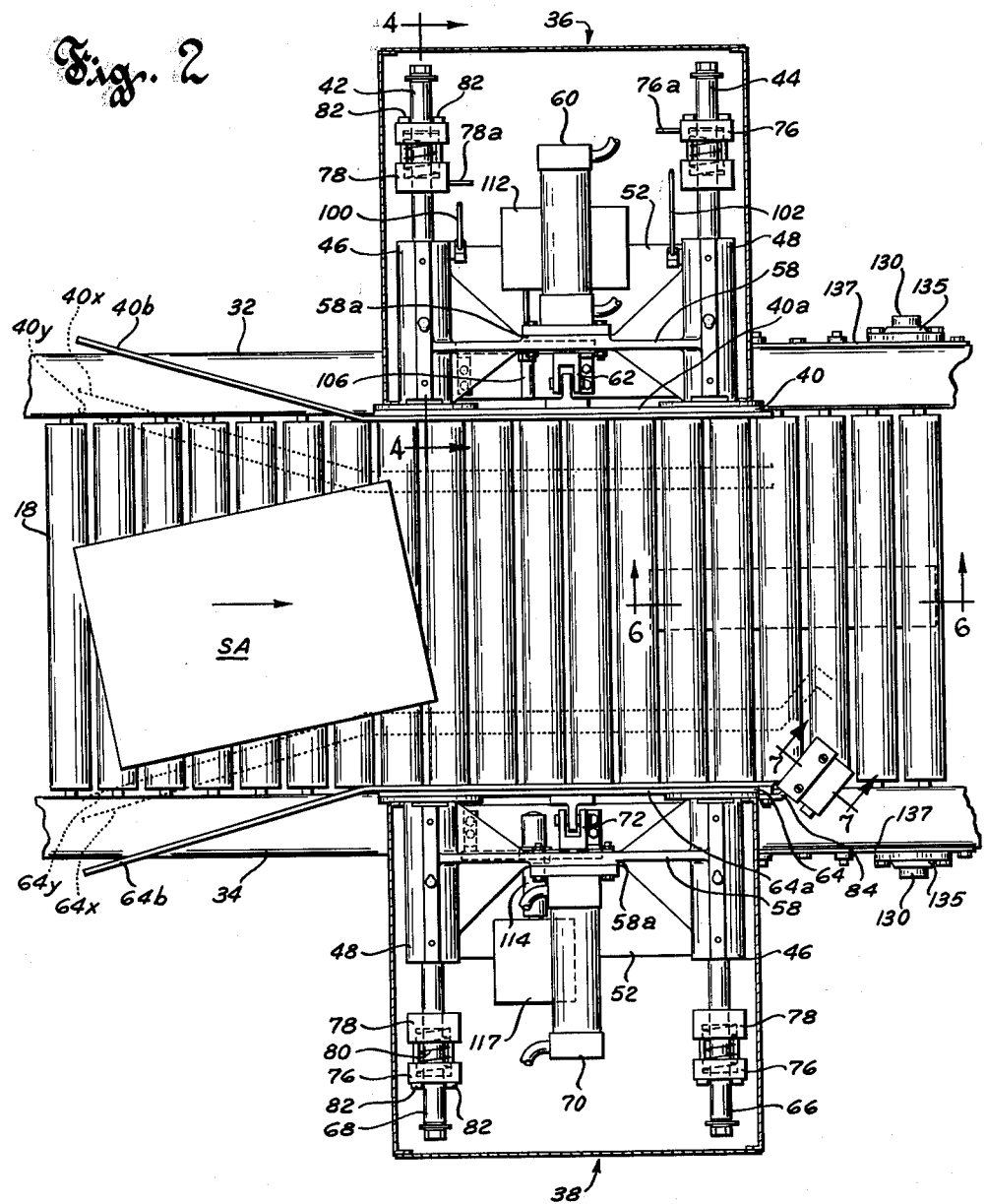

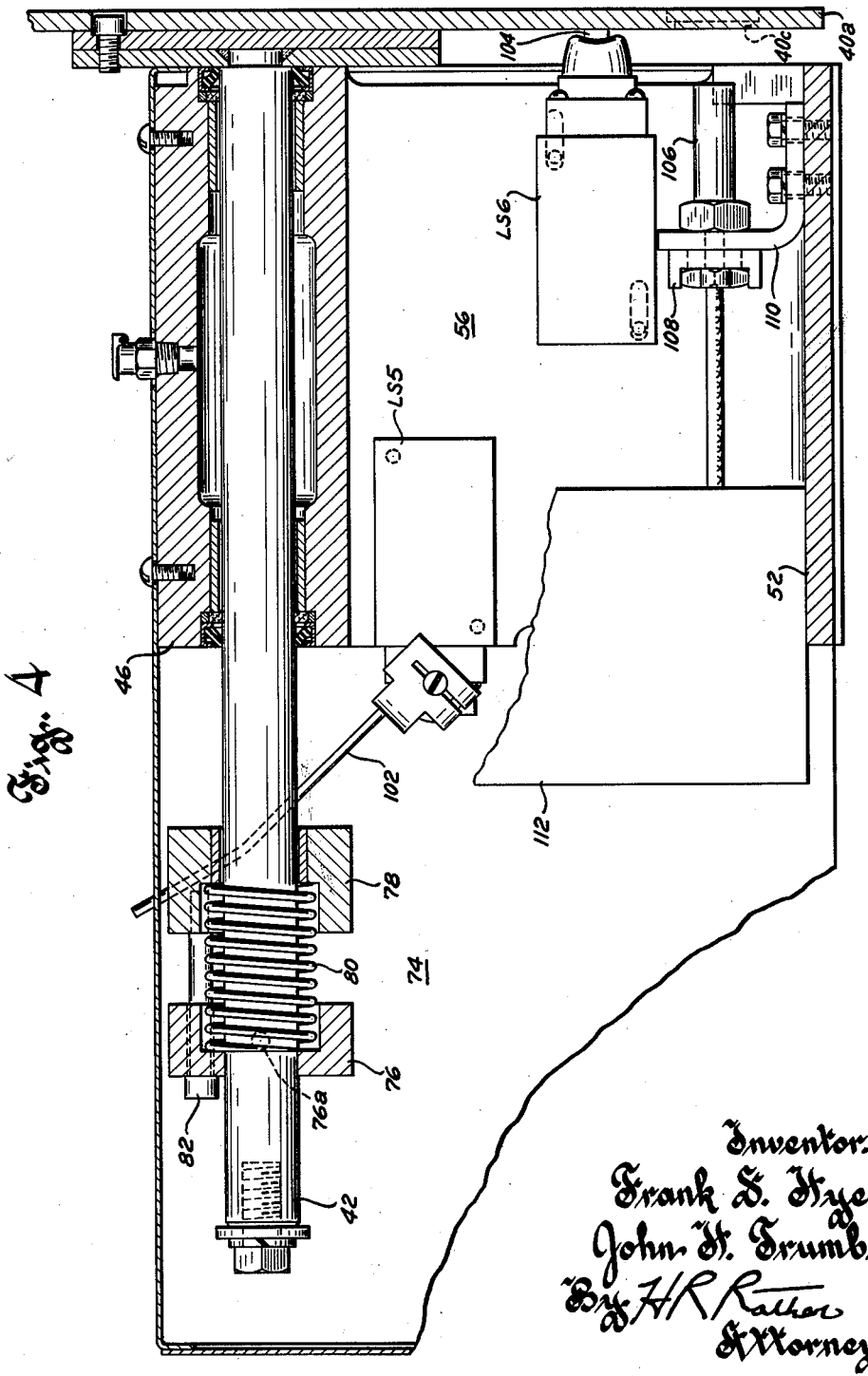

June 15, 1965 F. S. HYER ETAL 3,189,156
APPARATUS FOR ALINING AND SPACING ARTICLES
Filed Nov. 9, 1962 5 Sheets-Sheet 5

United States Patent Office 3,189,156
Patented June 15, 1965

3,189,156
APPARATUS FOR ALINING AND
SPACING ARTICLES
Frank S. Hyer, Whitefish Bay, and John H. Trumble,
Wauwatosa, Wis., assignors to Cutler-Hammer,
Inc., Milwaukee, Wis., a corporation of Delaware
Filed Nov. 9, 1962, Ser. No. 236,568
11 Claims. (Cl. 198—29)

This invention relates to apparatus for alining and spacing articles moving on continuously running conveyors.

While not limited thereto, the apparatus of the present invention is particularly suited for use with stacked, flexible articles such as newspapers and the like.

Use of mechanized equipment to successively stack, wrap and tie bundles of newspapers is becoming more and more prevalent in large metropolitan newspaper publishing plants. Proper application of a bottom wrap under an advancing stack of newspapers requires that the stack be properly alined along the conveyor axis of movement. Bundle tying machines require that incoming articles traveling at a given speed be spaced to correspond with the time required to process each article. Thus apparatus that will afford alining and spacing of the stacks of articles has come into use, and it is a primary object of the present invention to provide an improved form of such apparatus.

Another object is to provide an apparatus of the aforementioned type in which primary alinement of articles is effected while they are being advanced by the conveyor and article holding action is limited to a period required for a preceding article to move a predetermined distance beyond such apparatus.

A further object is to provide in the aforementioned apparatus for speed-up of the conveyor advancing action in a region overlapping the alining and spacing apparatus and a portion of the conveyor beyond such apparatus to insure that a previously alined and held article will be quickly moved out of such apparatus to insure its non-interference with a following article.

A still further object is to provide a control system which affords the aforementioned operation of such apparatus and for selection of one or the other of two spacings between successively released articles.

A more specific object is to provide positive, intermediate and final position determining means for plate members of an apparatus of the aforementioned type which is simple and repetitively accurate.

Other objects and advantages of the invention will hereinafter appear.

In carrying out the invention a pair of plate members are mounted in opposing relation on opposite sides of a continuously moving conveyor. Fluid power motors are provided for each member to rectilinearly move the same toward and away from each other. A control system utilizing a photoelectric relay and limit switches responsive to article and plate positions direct the movements of the plate members. When an article or stack of articles advances to a preselected point between the members a photoelectric relay responds to cause the member to move to first positions providing a spacing between plate members slightly greater than the article or stack width. This affords the article substantially in-line alinement while permitting it to be advanced by the conveyor. When the article nears the end of the plates a limit switch is operated which causes the members to move into final positions in which the article is squeezed and gripped against conveyor advancing action. If no preceding article is within a given zone beyond the members the squeezing and holding is momentary, but if there is, holding action is continued until a preceding article passes beyond the zone.

Because separate fluid power motors are used repetitive accurate positioning can be affected by differences in the two motors, control valves, etc. Thus resilient stops are provided with each of the plate members which engage stationary supports to positively define the intermediate positions of the members. The members in moving toward the final positions compress the resilient elements of the stops until other non-resilient elements engage each other to positively define such final positions.

When the foregoing apparatus is used with endless roller slat conveyors a speed-up device is used to effect rotation of a series of rollers as they advance through a region which overlaps the portion between the member and a portion of the conveyor therebeyond. This speed-up device is only made effective at the time a squeezed and held article is released to quickly move the latter out from between the members so that following articles will not be interfered with.

The accompanying drawings illustrate a preferred embodiment which will now be described in detail, it being understood that the embodiment illustrated is susceptible of various modifications in respect of details without departing from the scope of the appended claims.

In the drawings:

FIGURE 1 is a more or less schematic plan view showing a bundle handling and wrapping system;

FIG. 2 is a plan view to enlarged scale of a bundle aliner-spacer incorporating the invention which is used in the system of FIG. 1;

FIG. 3 is a side elevational view of the bundle aliner-spacer;

FIG. 4 is a view taken along the line 4—4 of FIG. 2;

FIG. 6 is a view taken along the line 6—6 of FIG. 2;

FIG. 7 is a view taken along the line 7—7 of FIG. 2;

FIG. 8 is a fragmentary view to larger view of certain mechanisms shown in FIG. 7 as viewed from the right side;

FIG. 9 is a view in side elevation of the mechanism shown in FIGS. 2 and 3 but looking from the opposite side.

Figure 10:
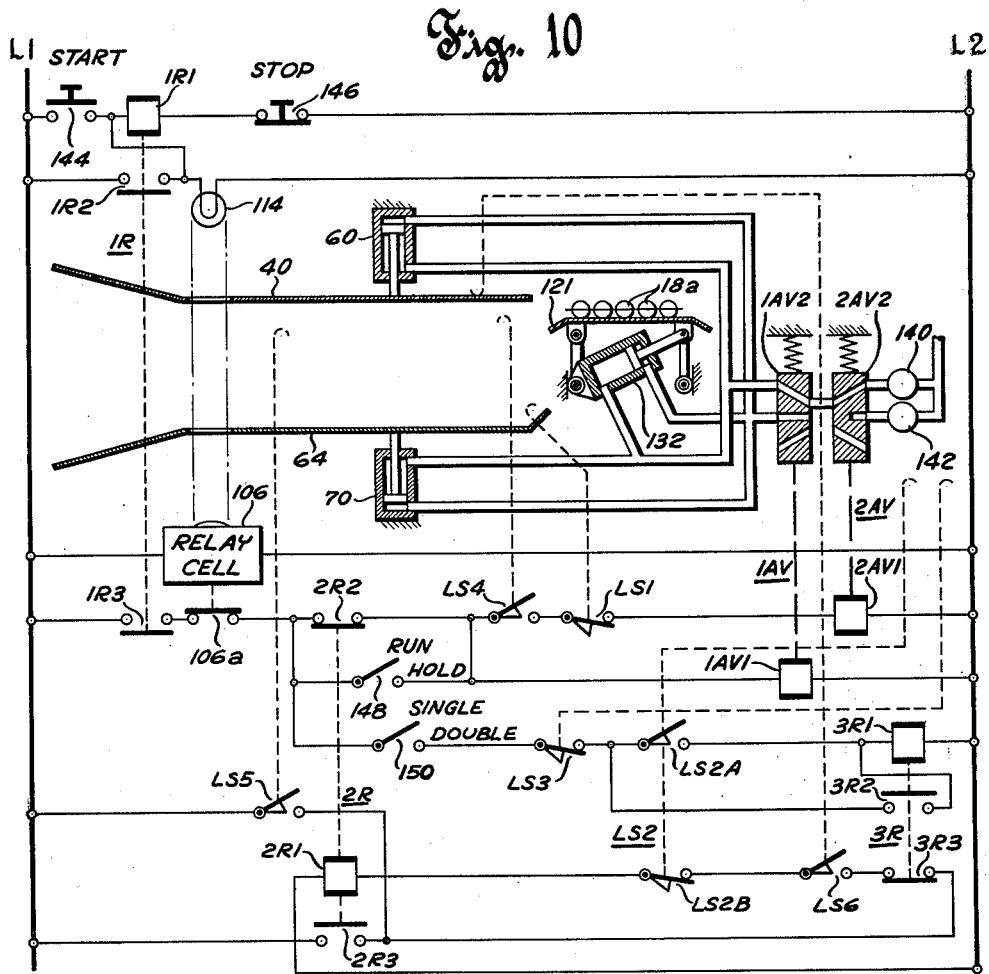
FIG. 10 is a diagrammatic showing of a control system for the bundle aliner-spacer.
Figure 5:
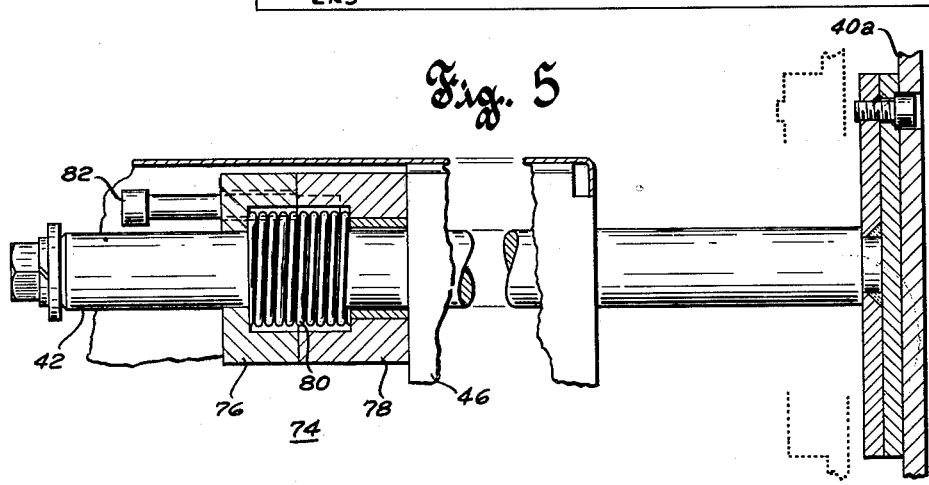
FIG. 5 is a fragmentary view showing a portion of the mechanism of FIG. 4 in another operating condition.

The system of FIG. 1, from left to right, comprises an automatic article stacker 16, a roller slat conveyor 18, a bundle aliner-spacer 20, a belt infeed conveyor 22, a bottom wrap inserter 24, a belt outfeed conveyor 26, a second roller slat conveyor 28 and a bundle tying unit 30. Stacker 16 may take various forms but when the system is used for stacking and bundling newspapers, a stacker of the form disclosed and claimed in the Howdle et al. Patent No. 2,819,661, now Reissue Patent No. 25,018 would be preferred. Roller slat conveyor 18 is of well known form wherein rollers are freely rotatably supported at spaced intervals on links of endless chains that run over end sprockets. The stack aliner-spacer which forms a major portion of the present invention will be hereinafter described in detail. Bottom wrap inserter 24 in one preferred form is like that shown in the Hyer application, Serial No. 227,898, filed October 2, 1962, and infeed and outfeed conveyors 22 and 26 are of conventional form. Conveyor 28 is like conveyor 18, and the bundle tier can take various forms preferably using wire which is mechanically looped about the bundle after the latter is compressed and then either twisted or welded to complete the tie.

Aliner-spacer 20 is provided to insure correct alinement as the bundle passes over the bottom wrap inserter and into the tying unit, and to control the spacing of bundles at intervals in accordance with the cycle time of the tying unit. As will also be later explained, its operation is partly controlled by the limit switch LS1 mounted on a portion of unit 20 and limit switches LS2 and LS3 which are adjustably mounted at spaced points to the right of limit switch LS1 as viewed in FIG. 1.

Referring to FIGS. 2 to 9, the aliner-spacer unit is mounted on top of the side frame channels 32 and 34 which are used to support the rollers, chain drive and end sprockets for the conveyor 18. Unit 20 comprises two similar assemblies designated 36 and 38 which are respectively mounted on channels 32 and 34 adjacent the ends of the conveyor rollers. Assembly 36, as best seen in FIGS. 2 and 9, has a vertically disposed plate 40 having a main portion 40a, which is parallel with the sides of conveyor 18, and an integral entering end portion 40b which extends outwardly at an angle from the portion 40a. Plate 40 is suitably secured and supported on the ends of spaced apart cylindrical rods 42 and 44 which are reciprocably movable in tubular guides 46 and 48, respectively. The guides 46 and 48 are each portions of an integral cast support and mounting frame which has a flat base portion 52 and spaced vertical struts 54 and 56 on which guides 46 and 48 are supported. A transverse web 58 medially interconnects guides 46 and 48 and has a rectangular flat pad 58a midway between the guides to which a pneumatic motor 60 is attached. Pad 58a has a clearance opening for the piston rod of motor 60 which has connection through a pin and clevis joint 62 with plate 40.

Assembly 38 as best seen in FIGS. 2 and 3, has a vertically disposed plate 64, which for the most part is a mirror image of plate 40 and has corresponding portions 64a and 64b. Portion 64a is secured and supported on the ends of cylindrical rods 66 and 68 which are reciprocably movable in tubular guides 46 and 48, respectively, which are part of an integrally cast support and mounting frame which is identical with that aforedescribed with the parts thereof bearing identical reference numerals. A pneumatic motor 70, like motor 60, is connected through the pin and clevis joint 72 to plate 64.

As best shown in FIG. 4, each of rods 42, 44, 66 and 68 is provided with a stop assembly 74 which includes a stationary block 76 secured to each of the rods, a movable spring block 78, a compression spring 80 which is disposed about each rod and seats at its opposite ends in cylindrical recesses formed in the opposed ends of the blocks 76 and 78. Block 76 is suitably adjustably clamped to the rods, and a pair of headed guide pins 82 passes through clearance openings therein and take down at their threaded ends into alined threaded openings in the block 78. As will be hereafter explained, when the plates 40 and 64 are moved toward each other, engagement of the blocks 78 with the ends of the guides 46 and 48 defines a first or initial article alining position, and then subsequent movement of the plates closer toward each other against the bias of the springs 80 to a position (see FIG. 5) wherein the blocks 76 are drawn into engagement with the blocks 78 defines second or final positions.

As best seen in FIGS. 2, 3 and 7, an inwardly turned plate 84 is secured to the right-hand end of portion 64a of plate 64. Limit switch LS1 is housed on a casing 86 which is secured to the outer surface of plate 84. The operating plunger of this limit switch passes through alined clearance openings in casing 86 and plate 84 and abuts against a pivoted plate 88 which is pivotally mounted on a hinge 90 at the top of plate 84. Plate 88 has a strut 94 secured thereto which passes through another clearance opening in plate 84 and projects between a pair of guide rollers 96—96 which are rotatably secured to the leg of an angle bracket 98 that is secured to plate 84. It may be assumed that the bias of the internal operating mechanism of limit switch LS1 will provide an outwardly extended position of its operating plunger which normally holds plate 88 in the position shown in FIG. 7. As will later be seen in the operation of the aliner-spacer, the stacks of newspapers or other articles engage plate 88 and move it counterclockwise as viewed in FIG. 7 to effect the opposite operating condition of switch LS1.

As best shown in FIGS. 2, 4 and 9 additional limit switches LS4, LS5 and LS6 are mounted on assembly 36. Switch LS4 is secured to strut 54 and has an elongated operating rod 100 which is engageable by a pin 78a secured to one of the blocks 78. Switch LS5 is secured to strut 56 and has an elongated rotatable operating rod 102 which is engageable by a pin 76a secured to a block 76 in the other set. Switch LS6 is also mounted on strut 56 and has a reciprocable operating plunger 104 which engages with portion 40a of plate 40. The receiving element 106 of a photoelectric relay is adjustably supported in an elongated opening in a channel member 108 which in turn is adjustably supported (upwardly or downwardly) adjacent its opposite ends on angle support brackets 110—110 that are secured to base 52. An aperture 40c which is similar in form to that in member 108 but somewhat greater in each dimension, is formed in portion 40a of plate 40 so that receiving element 106 has a clear window through the latter plate whatever its adjustment. A casing 112 secured to base 52 serves to enclose cable and terminal connectors for receiving element.

As best shown in FIGS. 2 and 3, a bulls-eye lensed tubular light source 114 of the photoelectric relay is carried by assembly 38. More particularly, the tube 114 is secured in a member 116 that is adjustable in position between the ends of a rod 118 supported against its ends on brackets 120 secured to base 52. The lensed end of light tube 114 faces an aperture 64c in portion 64a of plate which is similar in form and dimension to the corresponding aperture 40c in plate 40. It will be apparent that the adjustments afforded for light source 114 and receiving element 106 of the photoelectric relay permit their lineup for different positions in a limited range along the length of plates 40 and 64 as determined by the length of the apertures 40c and 64c. A casing 117 secured to the base 52 of assembly 38 serves to house electrical cable and terminal connection for source 114.

It will be apparent that mounting of the limit switches LS4, LS5 and LS6, or any of them, can alternatively be made on assembly 38 if desired. Also, the mounting of the receiving element 106 and light source 114 of the photoelectric relay can be reversed if desired. The role of these switches and photoelectric relays will hereinafter be explained in connection with FIG. 10.

In conjunction with the aliner-spacer, a conveyor roller speed-up unit is provided which is best shown in FIGS. 3 and 6. It comprises a plate, or shoe member 119 which is bent downwardly adjacent its ends. A transversely ribbed friction pad 121 is secured to the upper surface of the shoe. Pairs of brackets 122 are secured at opposite sides adjacent the ends of the shoe 119 and each pair of brackets have transversely alined openings to accommodate pivot pins 124 which also penetrate alined openings in the alined pairs of toggle links 126 which are nonrotatably secured to the rotatable shafts 128 and 130. A linear pneumatic motor 132 is secured at the base of its cylinder housing to a bracket 134 which is freely pivotable on shaft 128. The piston connecting rod 132a of motor 132 has a pin and clevis connection with a link 136 that is freely pivotable at its right-hand end on pin 124 (as viewed in FIG. 6). As best shown in FIGS. 2 and 3, the opposite ends of the shafts 128 and 130 are afforded end bearing support in anti-friction bearings that are housed in bearing housings 135. The housings 135 are adjustably mounted (upwardly and downwardly) on plates 137 that overlie clearance apertures in channels 32 and 34, and are secured to the latter.

Motor 132 has air admission and exhaustion openings 132b and 132c which communicate with the interior of the cylinder at opposite sides of the piston (not shown).

With air admitted to opening 132b and exhausted from opening 132c, the shoe and other members of the speed-up unit take the position shown in full lines in FIG. 6 in which the friction pad 121 engages with the rollers 18a of roller slat conveyor 18. As the rollers 18a are being linearly moved from left to right (as viewed in FIG. 6) on their carrier chain, the engagement of the friction pad 121 with rollers 18a causes them to be rotated clockwise on their longitudinal bearing axis. Thus if these rollers are being linearly moved at a velocity V, their rotation by engagement with pad 121 provides a peripheral velocity 2V on the top surface of the rollers.

As will be hereinafter explained, this rotation of the rollers 18a is momentarily used in each cycle of the aliner-spacer following completion of alining and/or holding action of a stack of articles to quickly drive the stack of articles out from the aliner-spacer so that the latter can accommodate and act on a following stack of articles without interference. When active, the friction pad of the speed-up unit engages a number of rollers disposed on either side of the downstream end of the aliner-spacer. Normally the shoe 119 and associated linkages will take the broken line positions shown in FIG. 6 which is that obtained when air is admitted to opening 132c and exhausted from opening 132b in motor 132.

A preferred control system for the aliner-spacer and speed-up unit is shown in FIG. 10. These units together with the aforementioned pneumatic operating motors, photoelectric relay and limit switches are interconnected with the selector switches and relays in an electrical control system which affords repeating cyclic operation in response to the presence of stacks of articles. More particularly, an electroresponsive air control valve 1AV is spring biased to the position depicted when its operating coil 1AV1 is deenergized. Its valve body 1AV2 has an upper passageway which in normal position is connected at one side to conduits which lead to lower and upper sides of the pistons in motor 60 and 70, respectively, and the left side of the piston in motor 132 is connected in series with the upper passageway in the body 2AV2 of another air control valve 2AV to the "low" pressure side of a pressure reducing valve 140 in a conduit which may be assumed to be connected at its "high" pressure side to a source of higher pressure air supply. Simultaneously, the middle passageway of valve body 1AV2 is connected at one side in series with the upper and lower sides of the piston in motors 60 and 70, respectively, and the right side of the piston in motor 132, and valve body 1AV2 is vented to the atmosphere at the other side of its middle passageway. Consequently plates 40 and 64 take their normal or starting positions, and the pad 121 of the speed-up unit in engagement with a number of rollers 18a to rotate the same as aforedescribed. Valve body 1AV2 has a third or lower, through passage which is ineffective in the normal position depicted, and valve body 2AV2 has a second or lower, through passageway which is likewise ineffective in such position.

Electrical power is afforded by A.C. supply lines L1 and L2. A momentary "start" switch 144 is connected at its left-hand side to line L1 and in series with the operating coil 1R1 of a relay 1R and a normally closed "stop" switch 146 to line L2. The right-hand side of switch 144 is also connected in series with light source 114 to line L2 with the latter also being connectable across lines L1 and L2 in series with normally open contacts 1R2 of relay 1R. Photoelectric relay 106 is electrically connected across lines L1 and L2 and when light source is extinguished may be assumed to effect closure of its contacts 106a as depicted. Contacts 106a are connectable at their left-hand side in series with normally open contacts 1R3 to line L1, and are connected through their right-hand side in series with normally closed contacts 2R2 of a relay 2R, and then in series with limit switches LS4 and LS1 and operating coil 2AV1 of valve 2AV to line L2, and also in series with operating coil 1AV1 of valve 1AV.

A two position "run-hold" switch 148 is connected in parallel with contacts 2R2 and together in series with coil 1AV1 between the right-hand contacts of photo relay 106a and line L2. A two position "single or double tie" switch 150 is connected at its left-hand side to the junction between contacts 106a and contacts 2R2 and switch 148, and is connected at its right-hand side in series with limit switches LS3, contacts LS2A of limit switch LS2, and the operating coil 3R1 of a relay 3R to line L2, and also in series with normally open contacts 3R2 of relay 3R and coil 3R1 of the latter to line L2.

Limit switch LS5 is connected at its right-hand side to line L2 in series with contacts 3R3 of relay 3R, limit switch LS6 and normally closed contacts LS2B of limit switch LS2, and operating coil 2R1 of relay to line L2. Normally open contacts 2R3 of relay 2R are connected at their left-hand side to line L1 and at their right-hand side to the junction between limit switch LS5 and contacts 3R3 of relay 3R.

Now let it be assumed with voltage applied across lines L1 and L2 that switch 144 is momentarily closed to provide an energizing circuit for coil 1R1 from line L1 through switch 144, coil 1R1 and switch 146 to line L2. Energization of coil 1R1 results in closure of contacts 1R2 to provide a holding circuit for coil 1R1 around switch 144, and in closure of contacts 1R3. Closure of contacts 1R2 results in energization of light source 114 and its emitted beam (assuming no articles in the intervening space) shines on the photocell of relay 106. When light is falling on the photocell, the relay operates to open its contacts 106a. Thus even though contacts 1R3 are closed, valves 1AV and 2AV and motors 60, 70 and 132 will remain in their operating positions shown.

With switch 148 in its "run" position and switch 150 in "single tie" position depicted, let it be assumed that a stack of articles "SA" shown in FIG. 2 is being conveyed on conveyor 18 and is in the laterally askew condition shown. As the foremost position of the stack of articles interrupts the light beam, photoelectric relay 106 operates to close its contacts 106a. Consequently, a circuit is completed through contacts 1R3, 106a and 2R2 and coil 1AV1 to line L2 to energize coil 1AV1 of valve 1AV. Valve body 1AV2 then operates upwardly to connect its lowermost passageway at one side to the adjacent end of pressure air reducing valve 140, through the upper passageway to valve body 2AV to the upper and lower sides of the piston in motors 60 and 70 and the right side of the piston in motor 132. Simultaneously the middle passage of body 1AV2 is connected at one side to the lower and upper side of the piston in motors 60 and 70 and the left side of the piston in motor 132, and at its other side to atmosphere. Accordingly, motors 60 and 70 operate to move plates 40 and 64 toward each other and engage the moving stack of articles "SA" therebetween. Motor 132 operates to toggle the speed-up unit to the afore-described broken line position shown in FIG. 6 wherein the friction shoe is out of engagement with rollers 18a. The plates 40 and 64 continue to move toward each other until they assume the broken line position "40X" and "64X" shown in FIG. 2 at which moment limit switch LS4 closes to complete an energizing circuit from line L1 through the then closed contacts 1R3, 106a and 2R2, limit switches LS4 and LS1 and coil 2AV1 to line L2 to energize the latter coil.

Energization of coil 2AV1 results in movement of valve body 2AV2 to its upper position against its spring bias to connect its lowermost passageway at one side to the discharge end of "low" pressure reducing valve 142 and at its other side to the conduits connected with the upper and lower ends of motors 60 and 70 and the right-hand end of motor 132. The relatively "low" pressure air then in motors 60 and 70 is sufficient to hold plates 40 and 64 in the "40X" and "64X" position but insufficient to move them inwardly against the force exerted by the springs 80. Such "low" pressure air also maintains the speed-up in a retracted position.

With plates 40 and 64 in their last mentioned positions the stack of articles will be alined longitudinally of conveyor 18 but there will be sufficient clearance between the sides of the stack and plates 40 and 64 so that the stack can be carried forwardly on the conveyor 18 until the leading end of the stack engages the pivoted plate 88 to open limit switch LS1. Opening of switch LS1 results in deenergization of coil 2AV1 and return of valve body 2AV2 to its normal position, under spring bias as a result "high" pressure air is again applied to the upper and lower ends of motors 60 and 70, respectively, and to the right-hand end of motor 132.

Plates 40 and 64 thereupon move toward each other until they attain their "40Y" and "64Y" positions, respectively, depicted in broken lines in FIG. 2. When the latter positions are attained limit switch LS5 closes to complete an energizing circuit from coil 2R1 of relay 2R from line L1 through switch LS5, contacts 3R3, limit switch (LS6 which closed when plate 40 moved out of its normal or extended position), contacts LS2B of limit switch LS2 and coil 2R1 to line L2. Contacts 2R2 then open and contacts 2R3 close to provide a momentary circuit for coil 2R1 around switch LS5.

The reopening of contacts 2R2 results in deenergization of coil 1AV1 and valve body 1AV2 returns to its normal position under its spring bias wherein it reconnects its upper passageway through the upper passageway in valve body 2AV2 to the reducing valve 140, and to motors 60, 70 and 132 depicted in FIG. 10. Thus "high" pressure air is supplied to the lower and upper ends of motors 60 and 70, respectively, and to the left-hand end of motor 132 while air is exhausted from the opposite end of the motors. consequently, plates 40 and 64 are moved apart while the speed-up unit is moved to its roller engaging position to quickly rotate rollers under the stack of articles to thus afford rapid movement of the stack out of the area between the stack alining and holding plates.

Now let it be assumed that plates 40 and 64 are in their "40Y" and "64Y" positions, and a preceding stack of articles is engaging the operating lever of limit switch LS2 thereby effecting closure of its contacts LS2A and opening of its contacts LS2B. In the assumed "single tie" or open position of switch 150 opening of contacts LS2A has no effect, but the opening of contacts LS2B permits the closure of limit switch LS5 from being effective to energize coil 2R1. Thus, until such preceding stack of articles clears limit switch LS2 to permit reclosing of its contacts LS2B, plates 40 and 64 will be maintained on their "40Y" and "64Y" positions in which they hold the following alined stack.

In certain systems it is desired to have the bundle tier 30 apply two successive wire ties about the compressed bundle at two spaced points along the length of the bundle. As will be understood the tier must go through two tying cycles on each bundle thereby more than doubling the total cycle time for each bundle. Thus increased spacing between successive bundles must be provided when "double" tying is used. When switch 150 is closed to its "double" tie position and contacts LS2A of limit switch are closed, an energizing circuit will be completed from line L1 through contacts 1R3, 106a, switch 150, limit switch LS3, contacts LS2A and coil 3R1 of relay 3R to line L2. Contacts 3R2 of the latter close to provide a momentary circuit from coil 3R1 around contacts LS2A of limit switch LS2. Contacts 3R3 open when coil 3R1 is thus energized and thus coil 2R1 cannot be energized by closure of limit switch LS5 and a stack between plates 40 and 64 will be held. As the preceding stack moves beyond the range of limit switch LS2 contacts LS2A reopen and contacts LS2B reclose. Opening of contacts LS2A has no effect on the energization of coil 3R1 and the latter continues to hold its contacts 3R3 open thereby continuing to permit completion of the energizing circuit for coil 2R1 of relay 2R.

Subsequently when the preceding stack engages the operating arm of limit switch LS3 to open its coil 3R1 becomes deenergized to reopen its contacts 3R2 and recloses its contacts 3R3. Reclosure of contacts 3R3 completes the energizing circuit for coil 2R1 and as aforedescribed opening of contacts 2R2 results in return of plates 40 and 64 to their retracted or normal positions are aforedescribed, and an alined stack being held is released and then accelerated forwardly by the action of the speed-up unit on certain of the rollers 18a. Thus with switch in its "double" tie position a preceding bundle must proceed as far as the position of limit switch LS3 before a succeeding bundle held between plates 40 and 64 will be released.

As depicted in FIG. 1, provision is made for adjusting the positions of limit switches LS22 and LS3 within a limited range, thereby permitting changing of the spacing between bundles for both "single" and "double" operation modes.

It will be observed that with switch 148 closed to its "hold" position valve coil 1AV1 will be continuously energized so long as contacts 106a of the photo relay are closed. This operating position is used when it is desired to maintain plates 40 and 64 continuously in their final positions such as when it may be necessary to clear jams in bottom wrap inserter 24 and/or in bundle tier 30.

We claim:

1. For aligning and spacing articles on a continuously moving conveyor, the combination with reciprocably movable members mounted in opposing relation on opposite sides of the conveyor and means for moving said members toward and away from each other, of control means for the first mentioned means comprising means responsive to movement of each article to a first point relative to said members to cause the latter to move toward each other from starting positions to intermediate positions affording in-line alinement of an article while it is being conveyed, means responsive to advance of the article to a second point relative to said members to cause the latter to move further toward each other to final positions in which they engage and hold the article against conveyor advancing action, and means responsive to presence of a preceding article in a given zone beyond said members to maintain said members in their final positions pending advance of the latter article beyond said zone.

2. The combination according to claim 1 wherein the last specified means responds to cause said member to momentarily engage said article and reversely move to their starting positions in the event no preceding article is in said zone when said members reach their final positions.

3. The combination according to claim 1 wherein the last specified means of said control means includes means to provide, selectively, the aforementioned holding action of the article while a preceding article is in said zone, or continuation of such holding action until such preceding article advances a given distance beyond the end of said zone.

4. The combination according to claim 1 wherein one of said members adjacent its exit end is provided with a portion extending at an angle towards the center line of the conveyor.

5. The combination according to claim 4 wherein a limit switch is mounted on said portion of said one of said members and wherein an operator for said limit switch is also movably mounted on such portion and responsive to engagement by an article to operate said limit switch to cause said members to move further toward each other to their first positions as aforestated.

6. The combination according to claim 1 wherein said means responsive to movement of each article to a first point includes a photoelectric relay and light source alined across said conveyor, and wherein said means responsive to presence of a preceding article includes a limit switch having an operator which is engaged by the latter article while moving through said given zone.

7. The combination according to claim 1 wherein the first mentioned means comprises a penumatic motor for each gate, electroresponsive valves and regulated sources of high and low pressure air, and wherein said control means is responsive as aforestated to operate said valves to connect said pneumatic motors approximately to said source of high pressure air to move said members toward and away from each other and to connect said pneumatic motors to said source of low pressure air to hold said members in their intermediate positions while a preceding article is in said given zone.

8. The combination according to claim 7 wherein said members are carried on rods which reciprocably move in stationary supports, and wherein positive position defining devices are mounted on at least one support rod of each member, said devices each comprising a collar secured to said rod, a second collar slidable with respect to the first mentioned collar within limits and a coiled compression spring disposed about said rod and bearing at opposite ends against said collars, and said devices engaging on their second collars with said stationary supports to define said intermediate positions of said members.

9. For alining and spacing articles being carried on an endless type roller slat conveyor, in combination, a pair of reciprocably movable members mounted in opposing relation on opposite sides of the conveyor, means for moving said members toward and away from each other, a third member movable to engage a series of rollers in a region that extends between and beyond the downstream end of said members to effect rotation of said rollers as an incident to linear advance of the latter, means to move said third member into and out of engagement with said rollers, and control means comprising means responsive to advance of an article to a first point relative to said pair of members to cause the latter to move from the starting positions toward each other to intermediate positions affording in-line alinement of the article while it is being conveyed, means responsive to advance of the article to a second point relative to said pair of members to cause the latter to move further toward each other to final positions in which they engage, and if a preceding article is in a given zone beyond the ends of said members hold the article against conveyor advancing action so long as a preceding article is in said given zone, and means under the direction of the last specified means for causing said third member to engage the conveyor rollers to effect increase in rate of movement of the article as it moves out between said members.

10. In an apparatus for alining and holding articles temporarily against movement as they are carried on a continuously moving conveyor, the combination with like assemblies mounted on opposite sides of the conveyor in opposed relation comprising plate members having support rods secured to and extending normally of the plane of the plate, stationary bearing supports in which said rods are reciprocably movable to guide and restrict said plate members of said assemblies when they are moved toward and away from each other and fluid power actuated means for moving said plates, of positive position defining devices mounted on at least one support rod of each plate member, said devices each comprising a resiliently biased element which when in extended position and engaging a stationary support defines an intermediate position for each plate when moved toward the other, and said devices each having another element which is engaged by its resiliently biased element upon further movement of a plate toward the other plate to define a final position for such plate.

11. The combination according to claim 10 wherein said position defining device comprises a collar secured to said rod, a second collar slidable with respect to the first mentioned collar within given limits, and a coiled compression spring disposed about said rod and bearing at opposite ends against said collars.

References Cited by the Examiner
UNITED STATES PATENTS 2,986,262   5/61   Powers _____ 198—29

SAMUEL F. COLEMAN, *Primary Examiner.*

EDWARD A. SROKA, *Examiner.*